(12) United States Patent
Raffo et al.

(10) Patent No.: US 8,910,110 B2
(45) Date of Patent: Dec. 9, 2014

(54) APPLICATION TRANSLATION COST ESTIMATOR

(75) Inventors: Louise Raffo, Reading (GB); John Woodward, Wokingham (GB); Juliette Fleming, Linlithgow (GB); Suzanne Kinkead, Basingstoke (GB)

(73) Assignee: Oracle International Corporation, Redwood Shores, CA (US)

( * ) Notice: Subject to any disclaimer, the term of this patent is extended or adjusted under 35 U.S.C. 154(b) by 1551 days.

(21) Appl. No.: 12/051,539

(22) Filed: Mar. 19, 2008

(65) Prior Publication Data

US 2009/0241115 A1    Sep. 24, 2009

(51) Int. Cl.
*G06F 9/44* (2006.01)
*G06F 17/28* (2006.01)
*G06Q 30/02* (2012.01)

(52) U.S. Cl.
CPC ..................................... *G06Q 30/02* (2013.01)
USPC ........... 717/100; 717/107; 717/123; 717/136; 704/2

(58) Field of Classification Search
CPC ....................................................... G06F 17/28
See application file for complete search history.

(56) References Cited

U.S. PATENT DOCUMENTS

| | | | | |
|---|---|---|---|---|
| 5,805,832 | A * | 9/1998 | Brown et al. .................... | 711/1 |
| 6,052,525 | A * | 4/2000 | Carlson et al. ................. | 717/100 |
| 6,185,729 | B1 * | 2/2001 | Watanabe et al. .............. | 717/100 |
| 6,345,243 | B1 * | 2/2002 | Clark ................................ | 704/2 |
| 6,526,426 | B1 * | 2/2003 | Lakritz ........................... | 715/264 |
| 6,789,252 | B1 * | 9/2004 | Burke et al. ................... | 717/100 |
| 7,152,222 | B2 * | 12/2006 | Kumhyr et al. ................ | 717/107 |
| 7,206,736 | B2 * | 4/2007 | Moore .............................. | 704/2 |
| 7,437,704 | B2 * | 10/2008 | Dahne-Steuber et al. ..... | 717/100 |
| 7,464,371 | B2 * | 12/2008 | Jenkins .......................... | 717/123 |
| 7,987,087 | B2 * | 7/2011 | Rich ................................. | 704/2 |
| 8,255,882 | B2 * | 8/2012 | Zhang et al. ................... | 717/136 |
| 8,452,814 | B1 * | 5/2013 | Yin et al. ....................... | 707/793 |
| 8,495,113 | B2 * | 7/2013 | Leite et al. ..................... | 707/607 |
| 2004/0168132 | A1 * | 8/2004 | Travieso et al. .............. | 715/536 |
| 2005/0086233 | A1 * | 4/2005 | Jenkins .......................... | 707/100 |

(Continued)

OTHER PUBLICATIONS

Brown, Peter et al., "The Mathematics of Statistical Machine Translation: Parameter Estimation", [Online], ACM 1993, pp. 263-311, [Retrieved from Internet on Jul. 31, 2014], <http://delivery.acm.org/10.1145/980000/972474/p263-brown.pdf>.*

(Continued)

*Primary Examiner* — Thuy Dao
*Assistant Examiner* — Ziaul A Chowdhury
(74) *Attorney, Agent, or Firm* — Kilpatrick Townsend & Stockton LLP (57) ABSTRACT

The invention provides a computer-implemented method for estimating the cost of translating a body of text associated with a software application, wherein the software application is configured to perform one or more tasks. In particular the method comprises: determining one or more content types associated with the body of text, wherein each content type has an average word count per content unit; assigning a number of tasks associated with the software application to each content type, wherein each task has an associated number of content units; generating an estimated word count for each content type based on the number of tasks assigned to each content type and the average word count per unit for each content type; summing the estimated word count for each content type to generate an estimated word count for the body of text; and calculating an estimated translation cost based on the estimated word count.

20 Claims, 5 Drawing Sheets

(56) References Cited

U.S. PATENT DOCUMENTS

| | | | |
|---|---|---|---|
| 2005/0246156 A1* | 11/2005 | Scanlan | 704/2 |
| 2008/0201334 A1* | 8/2008 | Simpson | 707/10 |
| 2009/0083023 A1* | 3/2009 | Foster et al. | 704/3 |
| 2009/0299726 A1* | 12/2009 | Canu et al. | 704/3 |
| 2013/0346062 A1* | 12/2013 | Lancaster et al. | 704/2 |

OTHER PUBLICATIONS

Franz Josef Och et al., "The Alignment Template Approach to Statistical Machine Translation", [Online], 2004, pp. 417-449, [Retrievd from Internet on Jul. 31, 2014], <https://files.ifi.uzh.ch/dbtg/sdbs13/T07.0.pdf>.*

Robert C. Moore, "Towards a Simple and Accurate Statistical Approach to Learning Translation Relationships amongWords", [Online], Jul. 2001, pp. 1-8, [Retrieved from Internet on Jul. 31, 2014], <http://research.microsoft.com/pubs/68867/word-assoc.pdf>.*

Fei Hung et al., "Automatic Extraction of Named Entity Translingual Equivalence Based on Multi-Feature Cost Minimization", [Online], ACL 2003, pp. 9-16, [Retrieved from Internet on Jul. 31, 2014], <http://dl.acm.org/citation.cfm?id=1119386>.*

* cited by examiner

APPLICATION TRANSLATION COST ESTIMATOR

BACKGROUND OF THE INVENTION

1. Field of the Invention

The present invention is in the field of application design. In particular, the present invention provides a computer implemented method of estimating translation costs before or during the design stage of a software application.

2. Description of the Related Art

When developing a software application, an important consideration is the cost of translating text information associated with the software application. This text may be embedded help, on-line help, user and/or technical manuals, and/or implementation documentation. Due to the growth of the Internet and the forces of globalization, an application developer is now able to distribute a software application globally to a number of different countries with different linguistic requirements. Additionally, it is also possible to provide a web based interface for an on-line application that can be accessed over the Internet by users speaking a plurality of languages; for example, a global firm may wish to provide a common software application to users in the United States of America, India and China. For complex software applications, distributed to a large number of heterogeneous users, the cost of translating related text can be considerable.

A software application is typically developed in a primary language and text related to this application is then translated into one or more secondary languages. As the text relating to the application is typically written in line with the development of the application, in the prior art, the problems of translation were typically addressed at the end of product development. For example, in the past, the word count of user assistance text in the primary language has been counted only on the completion of the software development. At that point, a translation budget was announced and decisions were made retrospectively about translation priorities in the light of how much translation was affordable. It was, therefore, impossible for user assistance writers to estimate the overall translation cost at any point prior to the end of software development.

Hence, in the art, there is a requirement to provide a solution that allows the translation cost of a software application to be predicted in advance of the development and/or release of the application; predetermined budget requirements to be met; and certain text content to be prioritized for translation.

BRIEF SUMMARY OF THE INVENTION

According to a first aspect of the present invention there is provided a computer implemented method for estimating the cost of translating a body of text associated with a software application, the software application being configured to perform one or more tasks, the method comprising:
 a. determining one or more content types associated with the body of text, wherein each content type has an average word count per content unit;
 b. assigning a number of tasks associated with the software application to each content type, wherein each task has an associated number of content units;
 c. generating an estimated word count for each content type based on the number of tasks assigned to each content type and the average word count per unit for each content type;
 d. summing the estimated word count for each content type to generate an estimated word count for the body of text; and
 e. calculating an estimated translation cost based on the estimated word count.

The present invention provides a method that enables translation costs for software applications to be estimated. Certain embodiments of the present invention also allow "what if" calculations to be performed and further allow certain elements of a body of the text to be prioritized for translation.

Preferably, step (b) comprises defining one or more task groups, each task group comprising a predetermined number of tasks; and assigning a number of tasks to each content type by assigning a task group to each content type. Step (b) may also further comprise determining the proportion of tasks within each task group that would require text for each content type. Step (c) may also comprise using the proportion of tasks to modify the estimated word count and/or calculating the product of the number of tasks, the number of content units per task and the average word count per content unit for each content type.

Preferably, the content type is determined as one of: Frequently Asked Question (FAQ), conceptual information, worked example, demonstration, process flow or reference and/or the task groups are further grouped into application activity groups to form a hierarchical activity model, wherein each content type is assigned to one of a task group or an activity group.

In certain embodiments steps (a) and (b) may be performed automatically by one or more classification algorithms. In other embodiments step (a) may comprise examining metadata associated with one or more sections of the body of text and using said metadata to determine the content type for the one or more sections.

In one variation the method may further comprise: determining the average amount of time required to translate one content unit of each content type; generating a time estimate for each content type based on the number of tasks assigned to each content type and the average time amount per content unit; and summing the time estimates for each content type to generate a time estimate for translation of the body of text. Such a variation may also comprise determining a start data and a due date for translating the body of text; and generating a workforce estimate by dividing the time estimate for translating the body of text by the time between the start date and the due date.

According to a second aspect of the present invention there is provided a computer program product comprising program code configured to perform the method of the first aspect.

BRIEF DESCRIPTION OF THE DRAWINGS

Embodiments of the present invention will now be described by way of example with reference to the accompanying drawings, in which.

DETAILED DESCRIPTION OF THE INVENTION

Figure 1:
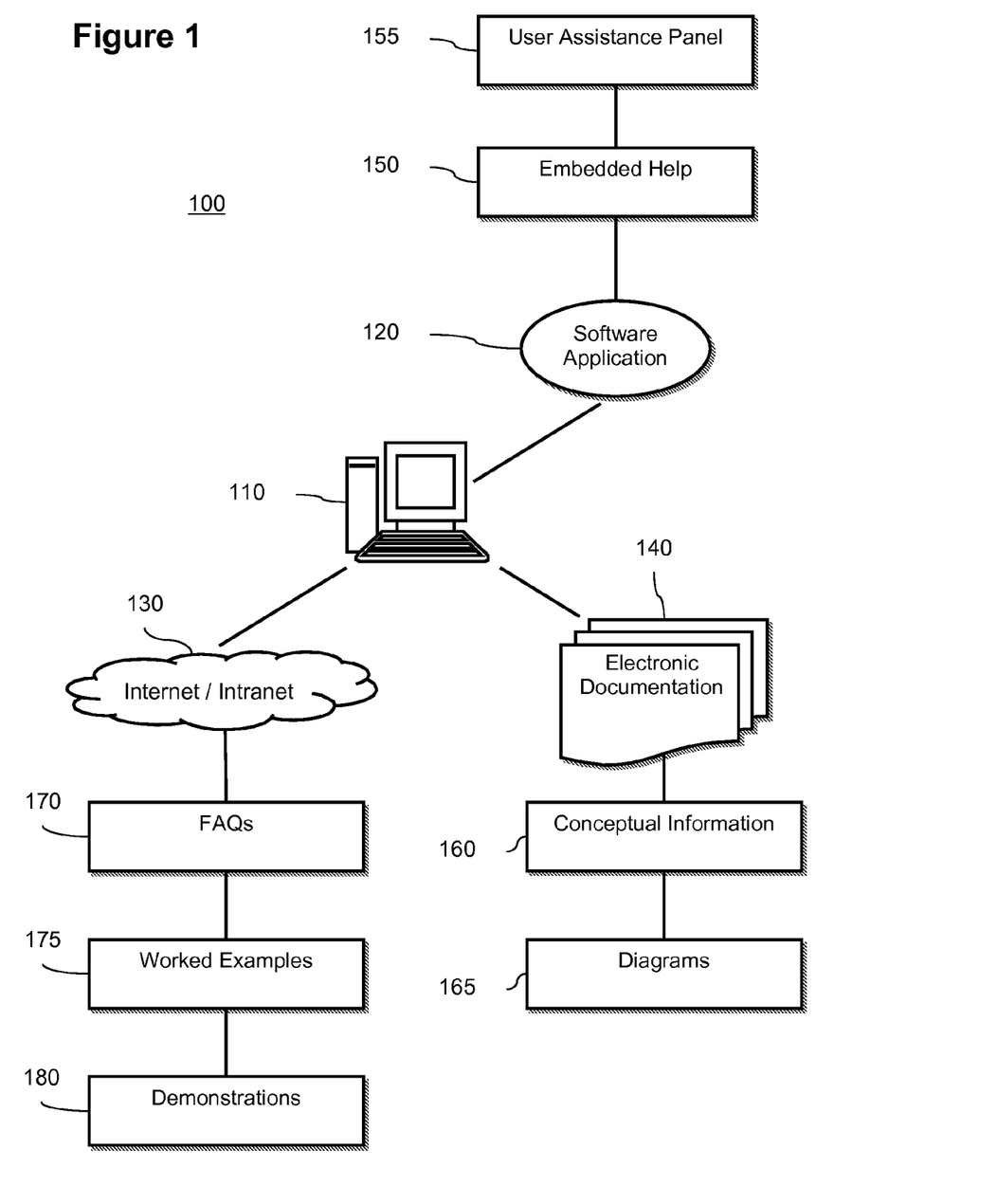
FIG. 1 illustrates schematically a body of text associated with a software application.

FIG. 1 illustrates the components of a body of text 100 associated with a software application. Software application 120 typically comprises program code that, in use, is stored in a memory of a computer system 110. This program code is then executed at appropriate times by a processor associated with the computer system 110. The software application 120 may be any one of a database application, a word processing application, an Enterprise Resource Planning application potentially incorporating Human Resources, Financials, Manufacturing and Projects; or generally any application that supports user tasks. Computer system 110 may be a stand alone computer system, such as a standard personal computer ("P.C."), or may be a server system adapted to provide the application over a network.

Associated with the software application 120 are a number of text components 150 to 180 that comprise text information relating to the software applications. This text information may be in the form of standard ASCII (American Standard Code for Information Interchange) text; embedded text within figures, tables, graphics, or multimedia presentations; or any other text that appears in the product whether as labels on the interface, embedded help for interface labels and fields, or supplementary help topics accessible by hyper link from the product interface. These text components 150 to 180 are typically associated with the software application 120 in a number of different ways; in the present example shown in FIG. 1 there are three groups of text components. A first group of text components comprises embedded help 150 and user assistance panel 155. These text components are embedded within the software application 120 and comprise text that is packaged and distributed with the application. A second group comprises conceptual information 160 and diagrams 165 that are distributed within electronic documentation 140 associated with the application 120 that exist as files independently of the application 120. Typically, such documentation is distributed with the software application 120 on (or over) a common medium. Finally, in the present example, there is a third group of text components comprising "Frequently Asked Questions" (FAQs) 170, worked examples 175 and demonstrations 180. These text components are in the form of HyperText Mark-up Language (HTML) files hosted upon a server connected to a distributed network 130 such as the Internet or an internal intranet. Text components in the form of HTML files may also further contain embedded data comprising additional text information, for example, worked examples 175 and demonstrations 180 may comprise embedded multimedia files that contain text information. In a preferred embodiment of the present invention the text components comprise user assistance text.

When interacting with the software application 120, a user will access text components 150 to 180 in order to provide assistance and explain certain functions of the application. Text components 150 to 180 may also help a user solve any problems that they encounter when using the software application 120.

In a modern global environment, software application 120 may need to be distributed to two or more countries in which two or more heterogeneous languages are spoken. In such a case, some or all of the associated body of text 100 comprising text components 150 to 180 will need to be translated into an appropriate language. Furthermore, in modern application development, certain aspects of an application may be developed in different countries where different languages are spoken. For example, the software application itself 120 may be developed in India, the electronic documentation 140 may be written in the United States of America, and text components 170 to 180 may be developed and written in France. Alternatively, text components 150 to 180 may be written by employees in the United Kingdom and the software application 120 may need to be distributed in countries belonging to the European Union (EU).

Figure 3:
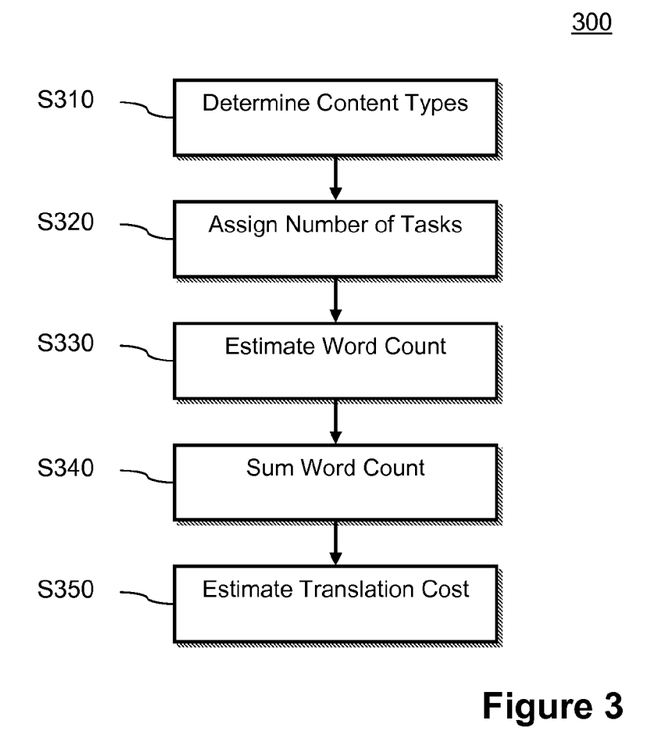
FIG. 3 shows a flow chart for estimating translation costs according to a first embodiment of the present invention.

A method of estimating the translation costs involved in translating a body of text 100 according to a first embodiment of the present invention is shown in FIG. 3. Method 300 enables more efficient management of the translation process and enables the costs to be evaluated at a number of points in time as application development progresses. The steps of method 300, and the steps of any method according to any embodiments of the present invention, may be implemented using program code stored upon storage media and adapted for loading into memory and running upon a computer processor. For example, the present invention may be implemented using a spreadsheet. Alternatively the steps of any of the methods of the present invention may be implemented in dedicated hardware and/or configurable logic, such as a Field Programmable Gate Array (FPGA) or any other known microprocessor.

The method of FIG. 3 begins at step S310 wherein the content types associated with the software application 120 are determined. In certain implementations, the content types may be predefined as shown in FIG. 1 and hence the content type of a text component may be evaluated by looking at file parameters or metadata associated with the text information. In other implementations, the content types may not be defined and thus the method may incorporate an algorithm design to scan documentation related to the software application, such as a set of files stored in a predetermined directory, and then classify segments of text based on associated metadata stored within the file or classification algorithms adapted to classify a segment of text as one of a number of known content types. The results of step S310 will be a list of content types associated with a particular software application 120. An example of such a content type list is given in the table below:

TABLE 1

| Content Type | |
| --- | --- |
| Embedded Help | Embedded Help |
|  | UA Panel |
| Non-embedded Help | FAQ |
|  | Conceptual Information |
|  | Process Flows |
|  | Demos |
|  | Worked Examples |
|  | Reference |

In this example the content types are separated into "embedded help", i.e. help such as 150 and 155 that is integrated within the program code of the application 120, and "non-embedded" help, for example components 160 to 180 that are separate from the application itself. After the content types associated with a software application 120 have been determined, an average word count per unit of content for each content type is assigned. In the present example, a unit of content type comprises a quantity of text information equivalent to an A4 page; however, a unit could also be defined in a number of different ways, for example, as a paragraph or as a certain number of bytes of information. The average word count per content unit may be determined individually for each software application or may be predefined. An example of the average word count per unit for a number of content types is provided in the table below:

TABLE 2

| Content Type | Average Word Count |
| --- | --- |
| EMBEDDED HELP | 100 |
| UA PANEL | 100 |
| FAQ | 500 |
| Conceptual Information | 500 |
| Worked Example | 1,000 |
| Reference | 500 |
| Demo | 0 (not translated) |
| Process Flows | 0 (not translated) |

At step S320 a number of tasks associated with the application are assigned to each content type, wherein each task has an associated number of content units. In the present case a task may comprise a function of the application or one of a group of possible configurations. For example, if the software application 120 is a payroll application, then the tasks may be assigned from the group of: receive input data, perform tax calculation, generate yearly tax report, and update function parameters. Certain content types may only be required for a subset of the group of possible tasks and thus the result of this step may be a table as shown below:

TABLE 3

| Content Type | | Assigned Tasks | Content Units per Task |
| --- | --- | --- | --- |
| Embedded Help | Embedded Help | 1267 | 1 |
| | UA Panel | 507 | 1 |
| Non-embedded Help | FAQ | 443 | 1 |
| | Conceptual Information | 688 | 1 |
| | Process Flows | 35 | 1 |
| | Demos | 63 | 1 |
| | Worked Examples | 149 | 1 |
| | Reference | 128 | 1 |

In the present example, the number of content units for each task is set at a default value of 1, representing that each task has one A4 page of associated content; however, a number of content units associated with each task may be edited by a user or calibrated based on particular tasks.

At step S330 an estimated word count for each content type is generated by multiplying the average word count per unit defined in Table 2 by the number of content units associated with each task defined in Table 3. The estimated word counts for each content type are then summed at step S340 to generate a total word count for the body of text 100 associated with the software application 120. At step S350 an estimated translation cost is generated by multiplying the total word count for the body of text 100 by a predetermined monetary cost per word; for example if the total word count was 100,000 and the cost per word was 10 cents then the total translation cost would be estimated to be $10,000. This estimated translation cost can then be compared with a pre-assigned budget for translation and appropriate development decisions can be made. The estimated translation cost will be a cost for translating the body of text from a first language to a second language.

Figure 4:
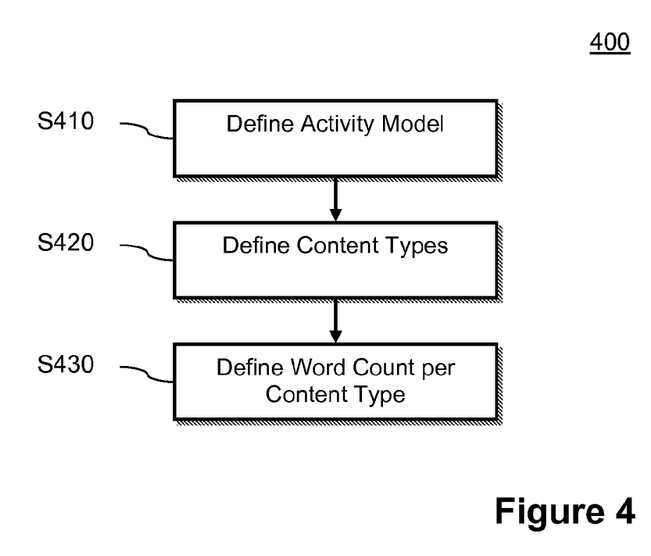
FIG. 4 shows a flow chart for defining predetermined parameters according to a second embodiment of the present invention.

A second embodiment of the present invention will now be described in relation to FIGS. 4 and 5. The second embodiment of the present invention provides a simple and efficient method to estimate the number of tasks assigned to each content type. Turning to FIG. 4, at step S410 an activity model is defined that provides a data structure for splitting the possible variations or configurations associated with the software application 120 into a number of levels. The greater the number of variations or configurations of the software application the more text will need to be translated. An example of such an activity model is given in FIG. 2.

Figure 2:
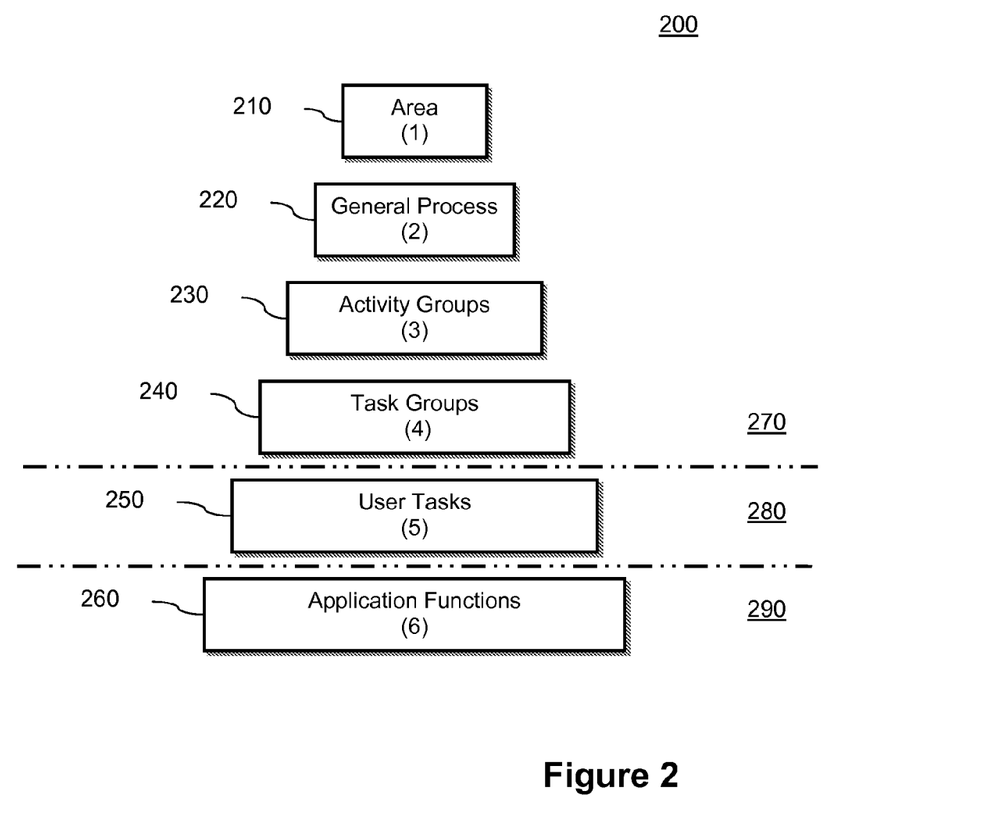
FIG. 2 schematically illustrates an activity model for use in categorizing tasks associated with the software application.

Starting from the bottom of the hierarchical activity model 200, the lowest stage of the model comprises a set of Application Functions 260 associated with the software application 120. The Application Functions 260 are defined at a physical level 290 wherein each function relates to a particular function embodied in a module of program code associated with the software application 120. Above the level of application function 260, a level of User Tasks 250 is defined. These User Tasks are defined at a logical level 280. A User Task is a set of operations performed by the user using one or more functions of the software application 120. For example, a User Task may be defined as "update user parameters" and the application functions 260 associated with that User Task may be defined as: "get data input from user", "compare inputted data with data held in database", "if inputted data differs from that held on file lock database for editing by user", "locate table containing data", "update data", "unlock database" and "return confirmation to user". Hence a User Task comprises a logical grouping of Application Functions 260 that are more appropriate to a task performed by a user and are independent of the actual implementation in the application, i.e. a number of independent functions may be used by the application to perform a logical task.

Levels 1 to 4 of the activity model 200, define an upper set of conceptual levels 270 that may be independent of the software application 120. At level 4, a set of Task Groups 240 are defined. A Task Group 240 represents an activity performed by a company or other organization and comprises a number of User Tasks 250. For example, Task Groups 240 may comprise a group such as "balance and validate payroll", which will require a number of User Tasks 250. Above level 4, level 3 defines a number of Activity Groups 230 which represent a detailed business process. Each Activity Group 230 comprises a number of Task Groups 240; for example an Activity Group 230 may be defined as Manage Payroll and the associated Task Groups 240 may comprise: "confirmed payroll readiness", "calculate, validate, and balance payroll" etc. Above level 3, level 2 of the hierarchical activity model 200 defines a number of General Processes 220 that represent the major functional groupings that describe a company or organization. For example, a General Process 220 may comprise "workforce deployment" which would then further comprise a number of activity groups 230, such as "manage payroll", "manage time and labor", "manage leave and absences" etc. At the top of the hierarchical model, level 1 defines an Industry Area 210 in which the software application 120 operates. For example, Industry Area 210 may comprise "human capital management (HCM)" and may comprise a number of General Processes 220 such as "enterprise planning and performance management", "recruiting", "workforce deployment", etc. The hierarchical activity model 200 is defined so that the number of different possible configurations in each group increases as the model moves from level 6 to level 1. For example, for a particular Industry Area 210 such as HCM there may be: 34 level 2 General Processes 220; 175 level 3 Activity Groups 230 and 1267 Task Groups 240. Hence, if a content type has associated level 3 and 4 configurations then there will be 1392 possible tasks for that content type in total. Typically, the decomposition of the activity model 200 is performed before any application design is begun, thus the number of tasks assigned to a level and the level structures will be predetermined. In certain embodiments the number and/or form of the levels of the activity model may vary from those discussed herein.

An example of a number of different task groups and their associated level 1, 2 and 3 designations is shown in the following table, wherein CI=Cross-Industry, EM=Employee Management, and MP=Manage Payments. In this example there are 10 level 4 tasks associated with a single level 3 Activity Group.

TABLE 4

| Area (1) | General Process (2) | Activity Groups (3) | Task Groups (4) |
|---|---|---|---|
| CI | EM | MP | Manage Payroll Records |
| CI | EM | MP | Interface with Other Supporting Systems |
| CI | EM | MP | Perform Pre-payroll Activities |
| CI | EM | MP | Confirm Payroll Preparedness |
| CI | EM | MP | Calculate and Reconcile Payroll |
| CI | EM | MP | Calculate Payroll Payments |
| CI | EM | MP | Confirm Payroll Complete |
| CI | EM | MP | Process Payroll Corrections |
| CI | EM | MP | Distribute Payroll Earnings |
| CI | EM | MP | Distribute Payroll Accounting Information |

Returning back to FIG. 4 after the activity model 200 has been defined at step S410 a number of content types are defined at step S420. For example the content types may be predefined as those shown in Table 1. At step S430 the average word count per unit per content type is defined to generate a set of standard metrics, for example by predefining the data shown in Table 2. The method 400 of FIG. 4 thus creates a standard activity model, a standard set of content types, and a number of standard word count metrics that may be used on a plurality of software applications.

Figure 5:
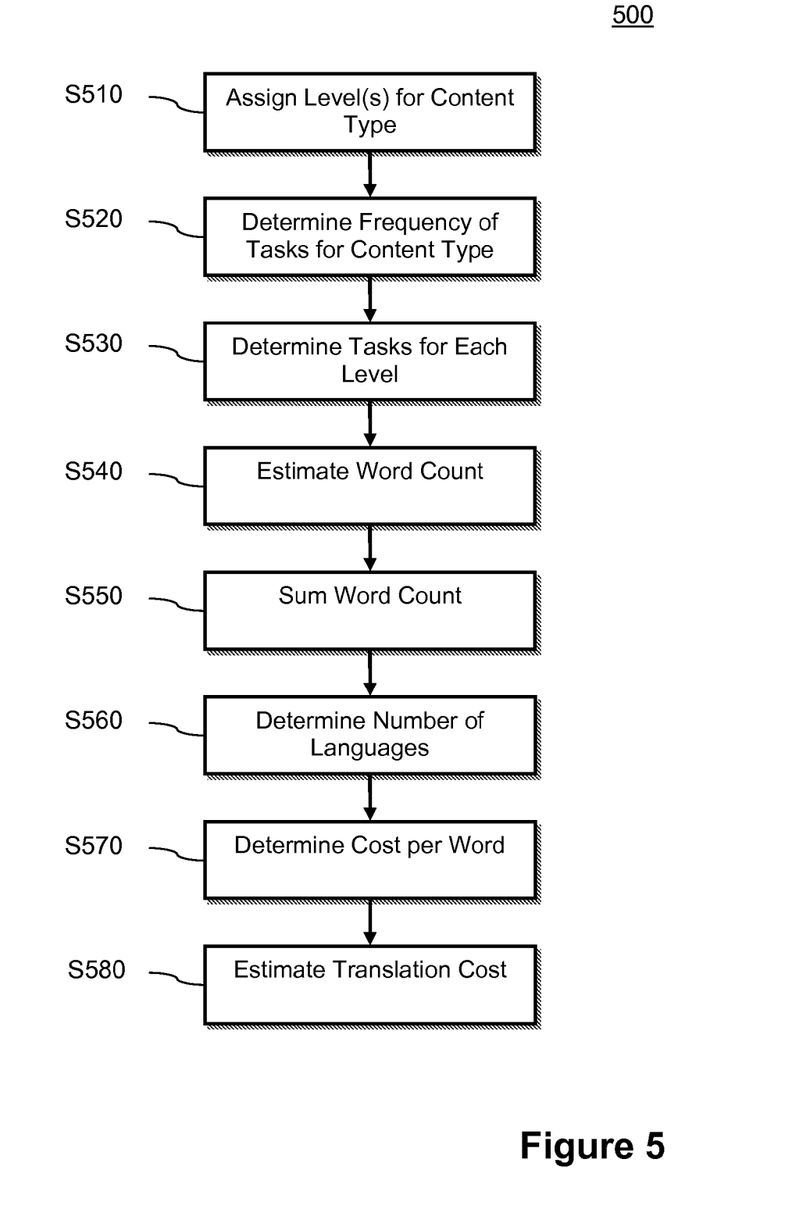
FIG. 5 shows a flow chart for estimating translation costs according to the second embodiment of the present invention.

FIG. 5 then illustrates an adapted version of the method 300 for use in a second embodiment of the present invention. At step S510 one or more levels from the activity model 200 are assigned to one or more of the content types defined in step S420. This then generates data as shown in the Table below:

TABLE 5

| Content Type | | Levels at Which Content Types Occur | | | | | Frequency | Variations |
|---|---|---|---|---|---|---|---|---|
| | | 1 | 2 | 3 | 4 | 5 | | |
| Embedded Help | Embedded Help | | | | | ✓ | 100% | 1267 |
| | UA Panel | | | | | ✓ | 40% | 507 |
| Non-embedded Help | FAQ | | | | | ✓ | 35% | 443 |
| | Conceptual Information | | | ✓ | ✓ | ✓ | 25% | 688 |
| | Process Flows | | | | ✓ | | 20% | 35 |
| | Demos | | | | | ✓ | 5% | 63 |
| | Worked Examples | | | | ✓ | | 85% | 149 |
| | Reference | | | | | ✓ | 10% | 128 |

In the above example, conceptual information 160 is required to explain to the user information relating to level 3, level 4 and level 5. At step S520 a calculation is made to determine what frequency of tasks or configurations that will need content for that particular content type. For example Table 1 above, embedded help is required for 100% of all tasks; however, worked examples are only required for 85% of tasks. This enables the scope, complexity and target users of a software product to be effectively evaluated. The frequency of tasks required for each content type may be predetermined or may be individually determined for each software application.

At step S530 the number of tasks associated with a software application performed at each level are determined. The total number of tasks for each level are read from data associated with the activity model: for example at level 3 230 there may be 34 associated tasks.

At step S540 a word count estimate is generated. Firstly, the total number of tasks for a particular content type are summed and then this sum is multiplied by the frequency of tasks for that content type to generate a total number of tasks. The number of content units associated with each task is then set, either by looking up a predetermined value or entering the value manually, and then the product of the total number of tasks, the associated number of content units for each task, and the average word count per content unit for each content type is calculated to estimate the word count for each content type. At step S550 the word count for each content type is summed across all content types to generate a estimated word count for the body of text for software application 120.

At step S560 the number of languages required for translation may optionally be selected from a group of one or more languages and hence the summed word count is multiplied by the number of languages required. At step S570 the cost per word is determined by entering a value cost per word or by looking up a predetermined value and at step S580 an estimated translation cost is calculated by calculating the product of the cost per word, the summed word count for content types and the number of languages. For example, if the summed word count was 100,000 words, the number of languages was 3 and the cost per word was 10 cents then the total estimated translation cost would be $30,000.

Figure 6:
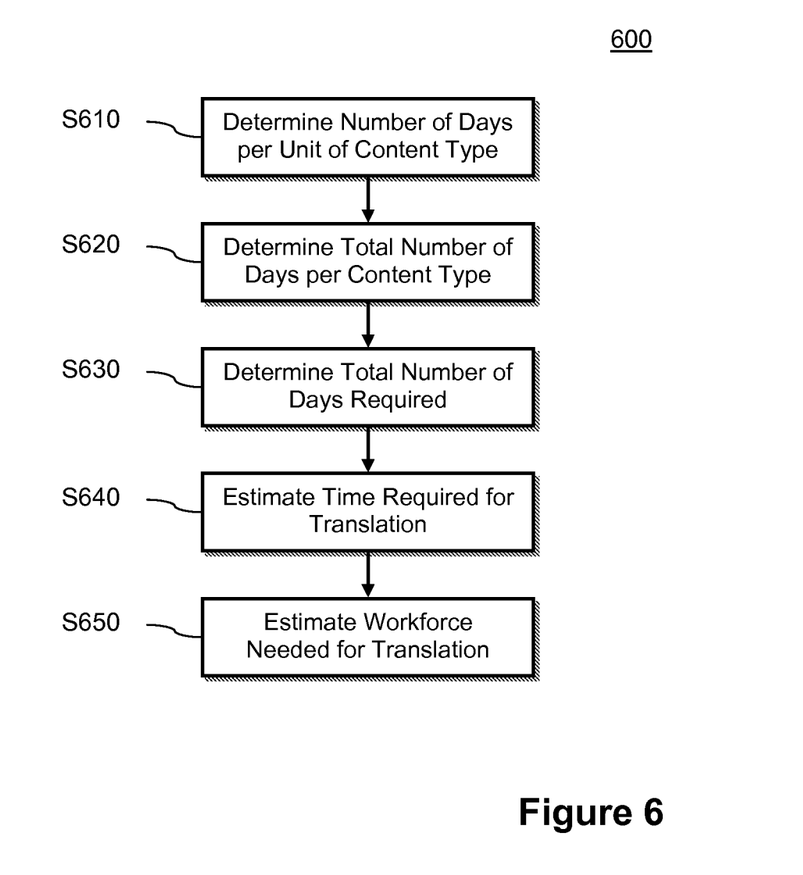
FIG. 6 shows a flow chart for estimating time and workforce requirements according to a third embodiment of the present invention.

A variation on the first and second embodiments is provided by a third embodiment of the present invention and a method associated with a third embodiment is shown in FIG. 6. Method 600 allows the time required for translation to be calculated along with the workforce needed to provide the calculation. At step S610 the number of days per content unit for each content type is determined. Then at step S620 the total number of days per content type is calculated by multiplying the number of days per unit of content type by the number of content units for that content type. The number of units for that content type is typically calculated by multiplying the number of tasks for that content type by the number of content units assigned per task in a similar manner to steps S540 and S330. At step S630 the total number of days required for all content types is calculated by summing the total number of days per content type across all content types and this then provides an estimated time required for translation at step S640. This estimated time may then be translated into a value in days, months and/or years. At step S650 the estimated workforce needed for translation by a given date may be calculated by specifying a number of working days available for each writer, wherein each working day comprise a predetermined number of working hours, and then dividing the time period between the current and given dates by the working days available for each writer. For example the result of step S650 may be a number of people required to translate the product by a given date.

The method of any of the embodiments described herein may be performed automatically by an algorithm adapted to process files related to the software application 120. In this case, certain predefined values may be stored in one or more data files accessible by the algorithm.

The present invention provides numeral advantages:

Responsiveness—translation costs can be estimated at an earlier date and so notice of any costs that are higher than expected can be obtained in advance;

Flexibility—certain parameters within the estimation process may be modified to change translation priorities and translation estimates may be updated in the light of new data;

Precision—as well as having an overall word count per software product, it becomes possible to view how the word count is distributed between content types and how the translation cost varies according to the number of languages translated;

Control—a decision can be made as to which content type should be translated based on cost estimates;

Transparency—translation costs can be made explicit and these costs can allow informed policy decisions and more efficient allocation of the translation budget; and Awareness—employees working on translation of documents can have a greater awareness of the significance of controlling translation costs.

Additionally, the present invention allows better targeting of translated materials, especially in emerging markets and allows localizations that would benefit most directly from translated text to be calculated.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

What is claimed is:

1. A computer-implemented method for estimating the cost of translating a body of text associated with a software application prior to development of the software application, the software application being configured to perform one or more tasks, the method comprising:

determining one or more content types associated with the body of text by classifying one or more documents related to the software application;

assigning to each content type an average word count per a content unit;

defining a hierarchical activity model for the software application and, based at least on the activity model, assigning activity levels for each content type;

assigning a number of tasks associated with the software application to each activity level of each content type, wherein each task has an associated number of content units and the number of tasks assigned to each content type is based at least in part upon a predetermined frequency of tasks required for each content type;

generating an estimated word count for each content type based on the number of tasks assigned to each content type and the average word count per unit for each content type;

summing the estimated word count for each content type to generate an estimated word count for the body of text; and calculating an estimated translation cost based on the estimated word count.

2. The computer-implemented method of claim 1, wherein the assigning the number of tasks further comprises:

defining one or more task groups, each task group comprising a predetermined number of tasks; and assigning a number of tasks to each content type by assigning a task group to each content type.

3. The computer-implemented method of claim 2, wherein the assigning the number of tasks further comprises:

determining the proportion of tasks within each task group that would require text for each content type.

4. The computer-implemented method of claim 1, wherein the content type is determined as one of: Frequently Asked Question (FAQ), conceptual information, worked example, demonstration, process flow, or reference.

5. The computer-implemented method of claim 2, wherein the task groups are further grouped into application activity groups to form the hierarchical activity model, and each content type is assigned to one of a task group or an activity group.

6. The computer-implemented method of claim 1, wherein the generating the estimated word count comprises calculating the product of the number of tasks, the number of content units per task and the average word count per content unit for each content type.

7. The computer-implemented method of claim 1, wherein at least one of the determining one or more content types or the assigning the number of tasks is performed automatically by one or more classification algorithms.

8. The computer-implemented method of claim 1, wherein the determining one or more content types comprises:

examining metadata associated with one or more sections of the body of text and using said metadata to determine the content type for the one or more sections.

9. The computer-implemented method of claim 1, the method further comprising:

determining the average amount of time required to translate one content unit of each content type;

generating a time estimate for each content type based on the number of tasks assigned to each content type and the average time amount per content unit; and summing the time estimates for each content type to generate a time estimate for translation of the body of text.

10. The computer-implemented method of claim 9, the method further comprising:

determining a start date and a due date for translating the body of text; and generating a workforce estimate by dividing the time estimate for translating the body of text by the time between the start date and the due date.

11. A computer program product for estimating the cost of translating a body of text associated with a software application prior to development of the software application, the computer program stored on a non-transitory computer readable medium comprising program code configured to:
   determine one or more content types associated with the body of text by classifying one or more documents related to the software application;
   assign to each content type an average word count per a content unit;
   define a hierarchical activity model for the software application and, based at least on the activity model, assign activity levels for each content type;
   assign a number of tasks associated with the software application to each activity level of each content type, wherein each task has an associated number of content units and the number of tasks assigned to each content type is based at least in part upon a predetermined frequency of tasks required for each content type;
   generate an estimated word count for each content type based on the number of tasks assigned to each content type and the average word count per unit for each content type;
   sum the estimated word count for each content type to generate an estimated word count for the body of text; and
   calculate an estimated translation cost based on the estimated word count.

12. The computer-implemented method of claim 2, wherein the generating the estimated word count comprises:
   modifying the estimated word count using the proportion of tasks.

13. The computer program product of claim 11, wherein the program code configured to assign the number of tasks is further configured to:
   define one or more task groups, each task group comprising a predetermined number of tasks; and
   assign a number of tasks to each content type by assigning a task group to each content type.

14. The computer program product of claim 13, wherein the task groups are further grouped into application activity groups to form the hierarchical activity model, and each content type is assigned to one of a task group or an activity group.

15. The computer-implemented method of claim 1, wherein the one or more documents related to the software application include a set of files stored in a predetermined directory.

16. A system for estimating the cost of translating a body of text associated with a software application prior to development of the software application, comprising:
   one or more processors, and
   at least one memory device including instructions that, when executed by the one or more processors, cause the one or more processors to:
      determine one or more predefined content types associated with the body of text, wherein each content type has a predefined average word count per content unit;
      define a hierarchical activity model for the software application and, based at least on the activity model, assign activity levels for each content type;
      assign a number of tasks associated with the software application to each activity level of each content type, wherein each task has an associated number of content units and the number of tasks assigned to each content type is based at least in part upon a predetermined frequency of tasks required for each content type;
      generate an estimated word count for each content type based on the number of tasks assigned to each content type and the average word count per unit for each content type;
      sum the estimated word count for each content type to generate an estimated word count for the body of text; and
      calculate an estimated translation cost based on the estimated word count.

17. The system of claim 16, wherein the instructions when executed causing the one or more processors to assign the number of tasks further cause the one or more processors to:
   define one or more task groups, each task group comprising a predetermined number of tasks; and
   assign a number of tasks to each content type by assigning a task group to each content type.

18. The system of claim 17, wherein the task groups are further grouped into application activity groups to form the hierarchical activity model, and each content type is assigned to one of a task group or an activity group.

19. The system of claim 16, wherein the instructions when executed causing the one or more processors to generate the estimated word count further cause the one or more processors to:
   calculate the product of the number of tasks, the number of content units per task and the average word count per content unit for each content type.

20. The system of claim 16, wherein the instructions when executed causing the one or more processors to determine one or more predefined content types further cause the one or more processors to:
   examine metadata associated with one or more sections of the body of text and using said metadata to determine the predefined content type for the one or more sections.

* * * * *